(12) United States Patent
Wang et al.

(10) Patent No.: US 11,957,109 B2
(45) Date of Patent: Apr. 16, 2024

(54) PATROL HELMET AND METHOD FOR LIVESTOCK AND POULTRY FARMS

(71) Applicant: Zhejiang University, Zhejiang (CN)

(72) Inventors: Kaiying Wang, Hangzhou (CN); Feiyue Hu, Hangzhou (CN); Weida Mei, Hangzhou (CN); Jiegang Wu, Hangzhou (CN); Xiaoshuai Wang, Hangzhou (CN)

(73) Assignee: Zhejiang University, Hangzhou (CN)

( * ) Notice: Subject to any disclaimer, the term of this patent is extended or adjusted under 35 U.S.C. 154(b) by 389 days.

(21) Appl. No.: 17/333,746

(22) Filed: May 28, 2021

(65) Prior Publication Data

US 2022/0201985 A1 Jun. 30, 2022

(30) Foreign Application Priority Data

Dec. 28, 2020 (CN) .......................... 202011581349.0

(51) Int. Cl.
*G09G 5/00* (2006.01)
*A01K 29/00* (2006.01)
*G02B 27/01* (2006.01)
*G06V 40/10* (2022.01)

(52) U.S. Cl.
CPC ........ *A01K 29/005* (2013.01); *G02B 27/0172* (2013.01); *G02B 27/0176* (2013.01); *G06V 40/10* (2022.01); *G02B 2027/0138* (2013.01)

(58) Field of Classification Search
CPC ....... G06T 19/006; G06T 19/00; G06F 3/011; G06F 3/012; G02B 27/017
USPC ......................................................... 345/633
See application file for complete search history.

(56) References Cited

U.S. PATENT DOCUMENTS

| | | | |
|---|---|---|---|
| 2020/0150758 A1* | 5/2020 | Kobayashi | G06F 3/011 |
| 2021/0059213 A1* | 3/2021 | Wooten | A01K 29/005 |
| 2022/0067377 A1* | 3/2022 | Park | G06T 7/62 |
| 2022/0361444 A1* | 11/2022 | Cannon | A01K 29/005 |

* cited by examiner

*Primary Examiner* — Gordon G Liu
(74) *Attorney, Agent, or Firm* — Edell, Shapiro & Finnan, LLC

(57) ABSTRACT

A patrol helmet and method for livestock and poultry farms is described herein. The patrol helmet is wirelessly connected to an online farm management system on a cloud platform. The patrol helmet includes a helmet body, a controller, an augmented reality (AR) display component, an infrared (IR) camera, and a visible light camera. The AR display component is secured at the bottom edge of the helmet body. Both the IR camera and the visible light camera are disposed on the helmet body. The IR camera, the visible light camera, and the AR display component each is electrically connected to the controller. The IR camera and the visible light camera are configured to photograph livestock or poultry in an area in front of a wearer to obtain a temperature and an image of the livestock or the poultry.

18 Claims, 2 Drawing Sheets

PATROL HELMET AND METHOD FOR LIVESTOCK AND POULTRY FARMS

CROSS-REFERENCE TO RELATED APPLICATIONS

This application claims priority to Chinese Patent Application No. CN 202011581349.0, filed Dec. 28, 2020, the entire disclosure of which is incorporated herein by reference in its entirety.

TECHNICAL FIELD

The present disclosure relates to the intelligent detection field of livestock and poultry breeding, and in particular, to a patrol helmet and method for livestock and poultry farms.

BACKGROUND

Healthy breeding of livestock and poultry and intelligent supervision of health statuses of the livestock and poultry are development directions of the livestock husbandry. With the rapid development of the large-scale and intensive livestock husbandry, it is increasingly difficult to manually supervise the health statuses of the livestock and poultry. Especially when some serious animals-related epidemics occur, lots of livestock and poultry in barns may be infected or even die, if the infected animals cannot be found in time. Therefore, a technology for rapidly and intelligently detecting the health condition of the livestock and poultry is becoming increasingly important.

Among health indexes of the livestock and poultry, the body temperature is the most direct indicator for measuring the health condition. In addition, an image which shows a real-time condition of an animal can visually reflect a health condition of it. At present, patrol robots are usually used to detect the health condition of animals. However, when patrol robots are used to measure the temperature and obtain the images of animals, the cost is high. And the patrol robots are hard to disinfect so it is easy to cause cross infection between different barns. Therefore, a convenient, safe, cheap, and efficient intelligent patrol method and device are urgently needed.

SUMMARY

Based on this, it is necessary to provide a convenient, safe, cost-effective, and efficient intelligent patrol helmet and method for livestock and poultry farms.

To implement the foregoing objectives, the present disclosure provides the following solutions:

The present disclosure provides a patrol helmet for livestock and poultry farms. The patrol helmet is wirelessly connected to an online farm management system on a cloud platform, and the patrol helmet includes a helmet body, a controller, an augmented reality (AR) display component, an infrared (IR) camera, and a visible light camera. The AR display component is secured at the bottom edge of the helmet body. Both the IR camera and the visible light camera are disposed on the helmet body. The IR camera, the visible light camera, and the AR display component each is electrically connected to the controller. The IR camera is configured to photograph livestock or poultry in an area in front of a wearer to obtain a temperature of the livestock or the poultry. The visible light camera is configured to photograph the livestock or the poultry to obtain an image of the livestock or the poultry. The controller is configured to process the temperature and the image of the livestock or the poultry by using an AR technology to obtain an AR image. The AR display component displays the AR image.

Optionally, the AR display component includes a lens, a display screen, and a free-form surface; and the lens is secured at the bottom edge of the helmet body, the free-form surface is embedded in the lens, the display screen is secured at a junction between the lens and the helmet body, and the free-form surface is configured to reflect, to human eyes, the AR image projected by the display screen.

Optionally, the display screen is a micro-OLED display screen.

Optionally, a plane on which the lens is located is perpendicular to a plane on which the bottom of the helmet body is located.

Optionally, the lens is coated with film to reduce an impact of glasses fogging when the wearer enters a house from outside in winter.

Optionally, the patrol helmet for livestock and poultry farms further includes a speaker, where the speaker is disposed on the helmet body, and is electrically connected to the controller.

Optionally, the helmet body includes a headband and a headband fastener fastened with the headband.

Optionally, the headband is adjustable.

Optionally, the headband is provided with operation keys, and the operation keys are electrically connected to the controller.

Optionally, the operation keys include an ON/OFF key, a volume increase key, a volume decrease key, and a scroll wheel.

The present disclosure further provides a patrol method for livestock and poultry farms. The patrol method is applied to the patrol helmet, and includes:

obtaining a temperature and an image of livestock or poultry;

processing the temperature and the image of the livestock or poultry by using an AR technology to obtain an AR image;

when the AR image displays the livestock or the poultry having an abnormal temperature, scanning a two-dimensional (2D) code carried on the livestock or the poultry to obtain a label of the livestock or the poultry, and uploading the label and the image of the livestock or the poultry to the online farm management system on the cloud platform, where the online farm management system is configured to determine an abnormality type of the livestock or the poultry and send a corresponding abnormality processing policy, and the online farm management system is further configured to send the image of the livestock or the poultry to a professional when the abnormality type cannot be determined; and when successfully obtaining the abnormality type and the abnormality processing policy that are sent by the online farm management system, performing processing according to the abnormality processing policy; or when failing to obtain the abnormality type and the abnormality processing policy that are sent by the online farm management system, performing processing according to online guidance of the professional or a tutorial video sent by the professional.

Compared with the prior art, the present disclosure has the following beneficial effects:

The present disclosure provides a patrol helmet and method for livestock and poultry farms. The patrol helmet includes a helmet body, a controller, an AR display component, an IR camera, and a visible light camera. The AR display component is secured at the bottom edge of the helmet body. Both the IR camera and the visible light camera are disposed on the helmet body. The IR camera, the visible light camera, and the AR display component each is electrically connected to the controller. In the present disclosure, the IR camera, the visible light camera, and the AR display component are disposed based on an AR technology. The IR camera and the visible light camera are used to photograph livestock or poultry in an area in front of a wearer, to obtain a temperature and an image of the livestock or the poultry, so that the AR display component displays the temperature and the image of the livestock or the poultry in an AR manner, to realize temperature abnormality detection for livestock or poultry in a farm. This avoids cross infection between different livestock or poultry houses, and realizes low costs and simple disinfection. The present disclosure realizes convenient and safe patrol in livestock and poultry farms.

BRIEF DESCRIPTION OF THE DRAWINGS

To describe the technical solutions in embodiments of the present disclosure or in the prior art more clearly, the accompanying drawings needed in the embodiments are introduced below briefly. Apparently, the accompanying drawings in the following description show merely some embodiments of the present disclosure, and other drawings can be derived from these accompanying drawings by a person of ordinary skill in the art without creative efforts.

DETAILED DESCRIPTION

The following clearly and completely describes the technical solutions in the embodiments of the present disclosure with reference to accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

To make the above objectives, features and advantages of the present disclosure clearer and more comprehensible, the present disclosure is described in further detail below with reference to the accompanying drawings and specific implementations.

Figure 1:
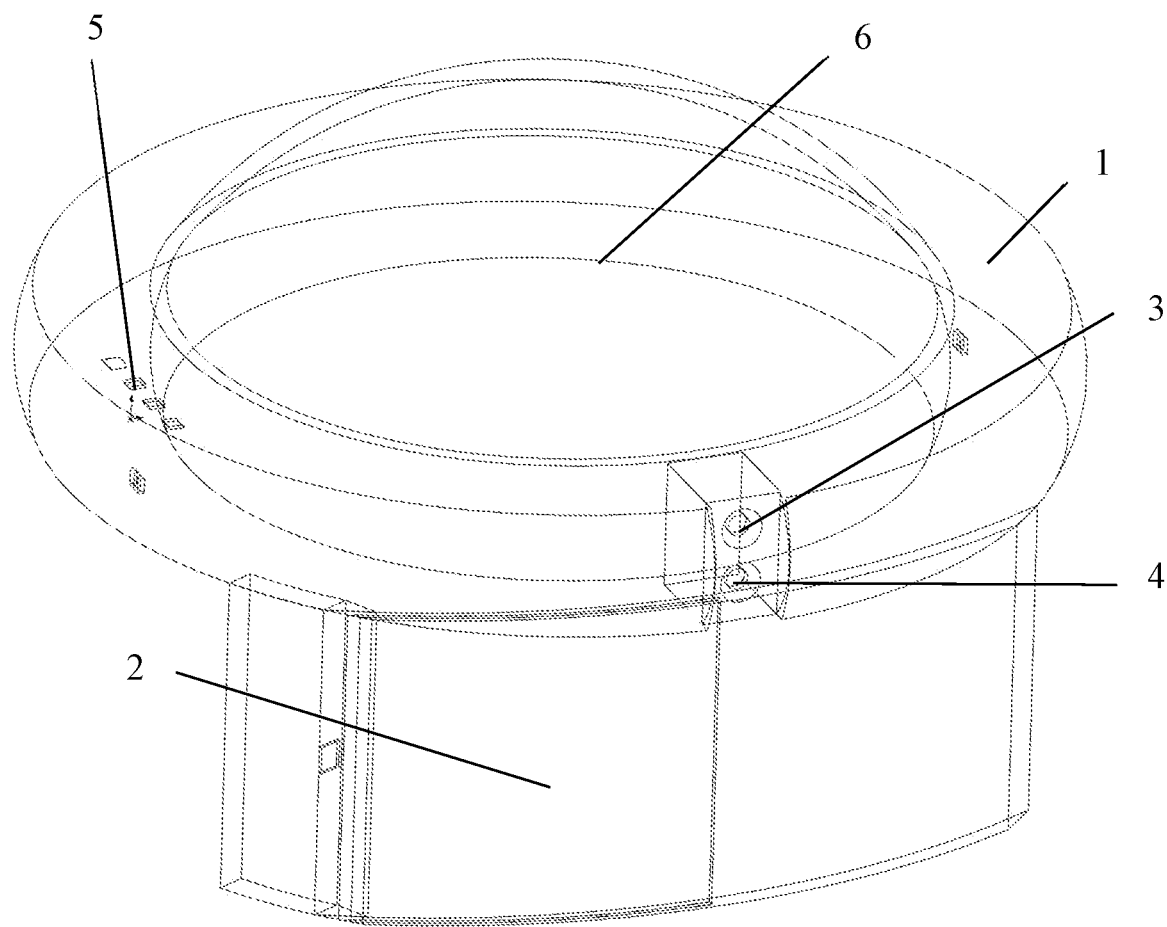
FIG. 1 is a schematic structural diagram of a patrol helmet for livestock and poultry farms according to an embodiment of the present disclosure.

FIG. 1 is a schematic structural diagram of a patrol helmet for livestock and poultry farms according to an embodiment of the present disclosure.

As shown in FIG. 1, the patrol helmet in this embodiment is wirelessly connected to an online farm management system on a cloud platform. The online farm management system may be built in an online farm management application (APP) in a mobile phone. The patrol helmet includes a helmet body, a controller, an AR display component 2, an IR camera 3, and a visible light camera 4. The AR display component 2 is secured at the bottom edge of the helmet body. Both the IR camera 3 and the visible light camera 4 are disposed on the helmet body. The IR camera 3, the visible light camera 4, and the AR display component 2 each is electrically connected to the controller. The IR camera 3 and the visible light camera 4 are configured to photograph livestock or poultry in an area in front of a wearer to obtain a temperature and an image of the livestock or the poultry. The controller is configured to process the temperature and the image of the livestock or the poultry by using an AR technology to obtain an AR image. The AR display component 2 displays the AR image. The AR technology is an existing mature technology. The controller in this embodiment may be any controller with existing built-in AR processing software, and this is not limited herein.

In an optional implementation, the AR display component 2 includes a lens, a display screen, and a free-form surface. The lens is secured at the bottom edge of the helmet body, the free-form surface is embedded in the lens, the display screen is secured at a junction between the lens and the helmet body, and the free-form surface is configured to reflect, to human eyes, the AR image projected by the display screen. In actual application, a plane on which the lens is located is perpendicular to a plane on which the bottom of the helmet body is located. The free-form surface is an optical element. The free-form surface may be one of prisms, and may be inlaid in the center of a right side of the lens. The display screen may be a micro-OLED micro display screen. The AR display component 2 uses a diffractive waveguide technology. The micro-OLED display screen disposed above the lens projects the image, and the image is finally reflected to a user's eyeball through multiple reflections by the free-form surface, so that an image display function is realized.

Figure 2:
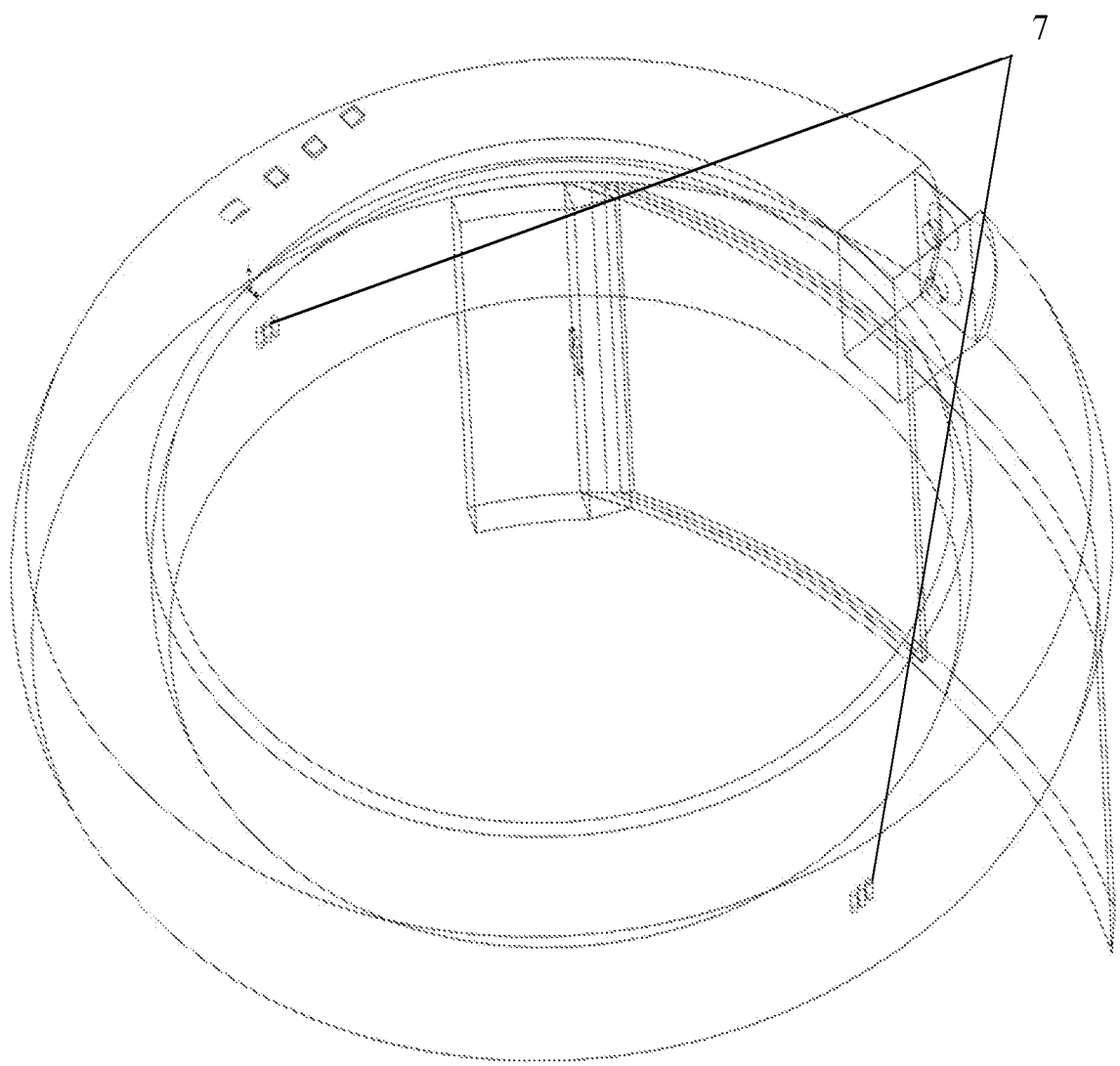
FIG. 2 is a schematic diagram showing a position of a speaker in a patrol helmet for livestock and poultry farms according to an embodiment of the present disclosure.

In an optional implementation, the patrol helmet for livestock and poultry farms further includes a speaker 7, as shown in FIG. 2. The speaker 7 is disposed on the helmet body, and is electrically connected to the controller. The controller compares the temperature, displayed in the AR image in real time, of the livestock or the poultry and a specified temperature that is internally stored. When the temperature exceeds the specified temperature, the speaker 7 reports an alarm to prompt the wearer of the livestock or the poultry with the abnormal temperature. In this implementation, only one comparator needs to be added to the controller. A model of the comparator is not limited herein, provided that a comparison function can be implemented.

In an optional implementation, the helmet body includes a headband 1 and a headband fastener 6 fastened with the headband 1. The headband 1 is adjustable to make it convenient for the wearer to adjust a degree of tightness of the helmet and enable the wearer to feel more comfortable.

In an optional implementation, the lens is coated with film to reduce an impact of glasses fogging when the wearer enters a house from outside in winter.

In an optional implementation, the headband 1 is provided with operation keys 5, and the operation keys 5 are electrically connected to the controller. The operation keys 5 successively include an ON/OFF key, a volume increase key, a volume decrease key, and a scroll wheel on the headband 1 from front to back.

In an optional implementation, the patrol helmet for livestock and poultry farms further includes a power supply. The power supply is electrically connected to the controller and the ON/OFF key. The power supply and the controller may be disposed inside the helmet body.

In an optional implementation, the controller further includes a receiver and a transmitter.

The present disclosure further provides a patrol method for livestock and poultry farms. The patrol method is applied to the patrol helmet, and includes:

obtaining a temperature and an image of livestock or poultry, and processing the temperature and the image of the livestock or the poultry by using an AR technology to obtain an AR image;

when the AR image displays the livestock or the poultry having an abnormal temperature, scanning a two-dimensional 2D code carried on the livestock or the poultry to obtain a label of the livestock or the poultry, and uploading the label and the image of the livestock or the poultry to an online farm management system on a cloud platform, where the online farm management system is configured to determine an abnormality type of the livestock or the poultry and send a corresponding abnormality processing policy, and the online farm management system is further configured to send the image of the livestock or the poultry to a professional (a veterinarian and an animal disease control professional) when the abnormality type cannot be determined, so that the professional provides online guidance by using a real-time video image or transmits a tutorial video to the patrol helmet; and when successfully obtaining the abnormality type and the abnormality processing policy that are sent by the online farm management system, performing, by a breeding and management person, processing according to the abnormality processing policy; or when failing to obtain the abnormality type and the abnormality processing policy that are sent by the online farm management system, learning, by a breeding and management person, how to deal with the livestock or the poultry according to the online guidance of the professional or by using the patrol helmet to watch the tutorial video.

A specific implementation process of the patrol helmet is as follows:

(1) A user presses the ON/OFF key to start the patrol helmet. After the patrol helmet is started, wireless fidelity (Wi-Fi) information is first set on an online farm management APP, and the APP generates a 2D code. The user selects a scanning mode by operating the scroll wheel on the headband 1, to scan the 2D code generated on the APP to connect to Wi-Fi in a livestock or poultry farm, or directly uses a 5G technology to connect the patrol helmet to the online farm management system on the cloud platform. When the farm is not covered by Wi-Fi, or 5G signals are not good, the patrol helmet automatically stores data. When the patrol helmet is reconnected to Wi-Fi or a 5G network, the data is transmitted to the online farm management system.

(2) After the IR camera 3 is preheated, a breeding and management person of a livestock or poultry house wears the patrol helmet and enters the livestock or poultry house. The IR camera 3 photographs an area in front of the wearer, performs temperature measurement in an area within 3 m in front of the wearer, and collects data to obtain a temperature of livestock or poultry. In this case, to reduce power consumption of the patrol helmet, the visible light camera 4 is temporarily disabled. The IR camera has been preheated. Therefore, when the IR camera reaches a certain temperature, an impact of a temperature difference and a humidity difference inside and outside the livestock or poultry house on the IR camera is significantly reduced.

(3) The following describes implementation processes of three patrol modes of the patrol helmet in the foregoing embodiment in actual application.

Mode 1

A pig is measured. A normal temperature of the pig ranges from 38° C. to 39.5° C. Therefore, the normal temperature of the pig is set to 38° C. to 39.5° C. in the controller. In addition, the pig's hair may affect a measurement result, and some studies show that the pig's eye temperature is close to a rectal temperature in non-contact temperature measurement. Therefore, the pig's eye can be measured in the non-contact temperature measurement. Therefore, in this mode, the pig's eye is set as a temperature measurement area in the controller. When it is found through measurement that there is a pig whose temperature is beyond the temperature range, the controller outputs a high level to the speaker 7. The speaker 7 reports an alarm to prompt the wearer of the pig with the abnormal temperature.

Mode 2

A cow is measured. A normal temperature ranges from 38.5° C. to 39.5° C. for a calf, 38° C. to 39.5° C. for a young cow, and 38° C. to 39° C. for an adult cow. Therefore, the normal temperature of the cow is set to 38° C. to 39.5° C. in the controller. In addition, the cow's hair may affect a measurement result. Therefore, in this mode, the cow's eye is set as a temperature measurement area in the controller. When it is found through measurement that there is a cow whose temperature is beyond the temperature range, the controller outputs a high level to the speaker 7. The speaker 7 reports an alarm to prompt the wearer of the cow with the abnormal temperature.

Mode 3

A chicken is measured. A temperature of the chicken usually maintains at 40.5° C. to 42° C. in a healthy state. Therefore, a normal temperature of the chicken is set to 40.5° C. to 42° C. in the controller. In addition, the chicken's feathers may affect a measurement result. Therefore, in this mode, the crest is set as a temperature measurement area in the controller. When it is found through measurement that there is a chicken whose temperature is beyond the temperature range, the controller outputs a high level to the speaker 7. The speaker 7 reports an alarm to prompt the wearer of the chicken with the abnormal temperature.

(4) After livestock or poultry with an abnormal temperature is found, the visible light camera 4 is enabled to photograph the livestock or poultry with an abnormal temperature. The breeding and management person use the visible light camera of the patrol helmet to scan an identifier on the livestock or poultry with an abnormal temperature (a 2D code on an ear label for the pig and the cow, and a 2D code on a foot ring for the chicken), and uploads the 2D code to the online farm management system on the cloud platform. The online farm management system can determine the livestock or poultry with an abnormal temperature based on information of the 2D code. In addition, the transmitter in the controller can upload corresponding abnormal data to the cloud platform to modify a health status of the livestock or poultry with an abnormal temperature in real time. The corresponding abnormal data is the temperature and the image.

(5) After the online farm management system completes information modification, the patrol helmet automatically uploads a real-time video image. According to the abnormal image obtained by the patrol helmet and by referring to clinical manifestations of common diseases of livestock and poultry in a database, the online farm management system intelligently determines a problem of the livestock or poultry with an abnormal temperature and provides a solution. For example, if ears of a pig in an image are blue, it can be determined that the pig suffers from only the porcine reproductive and respiratory syndrome (PRRS). If the online farm management system cannot determine the corresponding abnormal condition, a veterinarian and a remote animal disease control professional are informed to determine a cause of the abnormal temperature of the livestock or the poultry online based on the uploaded image, to find out the livestock or poultry with an abnormal temperature. In a process of finding out the livestock or poultry with an abnormal temperature, the veterinarian and the animal disease control professional can guide the breeding and management person online by using real-time video images, to photograph targeted image details based on an actual situation, to better identify a disease of the livestock or poultry with an abnormal temperature. In addition, the breeding and management person can use the patrol helmet to watch a tutorial video provided by the online farm management system or tutorial videos fed back by the veterinarian and the animal disease control professional, to learn how to process the livestock and poultry with an abnormal temperature. The 2D code is set on the ear tag or the foot ring, and its size is limited. Therefore, it is not easy to scan a plurality of 2D codes at the same time.

(6) After completing patrol work of a livestock or poultry house or unit, the staff use alcohol cottons to clean the patrol helmet to remove all kinds of dust attached to the patrol helmet, use ultraviolet and ozone to disinfect the patrol helmet, and store the patrol helmet in time after disinfection, to extend a service life of the patrol helmet.

In the embodiments, based on the Internet and the cloud platform, the wearable patrol helmet with high performance and low power consumption is developed to make it convenient for the staff to quickly lock the livestock or poultry with an abnormal temperature. In addition, the patrol helmet can transmit images in real time, so that the animal disease control professional can remotely diagnose a health status and a disease of livestock or poultry with an abnormal temperature or an abnormal body condition, and provide prevention and control guidance. Moreover, the patrol helmet can connect to the cloud platform to obtain identity information of livestock and poultry, to give a warning for a health status of corresponding livestock or poultry in real time, so that livestock and poultry breeding and management persons can perform processing in time.

Each embodiment of this specification is described in a progressive manner, each embodiment focuses on the difference from other embodiments, and the same and similar parts between the embodiments may refer to each other.

In this specification, several examples are used for illustration of the principles and implementations of the present disclosure. The description of the foregoing embodiments is used to help illustrate the method of the present disclosure and the core principles thereof. In addition, a person of ordinary skill in the art can make various modifications in terms of specific implementations and the scope of application in accordance with the present disclosure. In conclusion, the content of the present specification shall not be construed as a limitation to the present disclosure.

What is claimed:

1. A patrol helmet for livestock and poultry farms, wherein:
    the patrol helmet is wirelessly connected to an online farm management system on a cloud platform, and the patrol helmet is configured to be worn by a wearer to patrol livestock and poultry in the livestock and poultry farms;
    the patrol helmet comprises a helmet body, a controller, an augmented reality (AR) display component, an infrared (IR) camera, and a visible light camera;
    the AR display component is secured at the bottom edge of the helmet body;
    both the IR camera and the visible light camera are disposed on the helmet body;
    the IR camera, the visible light camera, and the AR display component each is electrically connected to the controller;
    the IR camera is configured to photograph livestock or poultry in an area in front of the wearer to obtain a temperature of the livestock or the poultry;
    the visible light camera is configured to photograph the livestock or the poultry to obtain an image of the livestock or the poultry;
    the controller is configured to process the temperature and the image of the livestock or the poultry by using an AR technology to obtain an AR image; and
    the AR display component displays the AR image.

2. The patrol helmet for livestock and poultry farms according to claim 1, wherein the AR display component comprises a lens, a display screen, and a free-form surface; and
    the lens is secured at the bottom edge of the helmet body, the free-form surface is embedded in the lens, the display screen is secured at a junction between the lens and the helmet body, and the free-form surface is configured to reflect, to human eyes, the AR image projected by the display screen.

3. The patrol helmet for livestock and poultry farms according to claim 2, wherein the display screen is a micro-OLED display screen.

4. The patrol helmet for livestock and poultry farms according to claim 2, wherein a plane on which the lens is located is perpendicular to a plane on which the bottom of the helmet body is located.

5. The patrol helmet for livestock and poultry farms according to claim 1, further comprising a speaker, wherein the speaker is disposed on the helmet body and is electrically connected to the controller.

6. The patrol helmet for livestock and poultry farms according to claim 1, wherein the helmet body comprises a headband and a headband fastener fastened with the headband.

7. The patrol helmet for livestock and poultry farms according to claim 6, wherein the headband is adjustable.

8. The patrol helmet for livestock and poultry farms according to claim 6, wherein the headband is provided with operation keys, and the operation keys are electrically connected to the controller.

9. The patrol helmet for livestock and poultry farms according to claim 8, wherein the operation keys comprise an ON/OFF key, a volume increase key, a volume decrease key, and a scroll wheel.

10. A method for livestock and poultry farms, wherein the method is applied to the patrol helmet according to claim 1, and the method comprises:
    obtaining a temperature and an image of livestock or poultry;
    processing the temperature and the image of the livestock or poultry by using an AR technology to obtain an AR image;
    when the AR image displays the livestock or the poultry having an abnormal temperature, scanning a two-dimensional (2D) code carried on the livestock or the poultry to obtain a label of the livestock or the poultry, and uploading the label and the image of the livestock or the poultry to the online farm management system on the cloud platform, wherein the online farm management system is configured to determine an abnormality type of the livestock or the poultry and send a corresponding abnormality processing policy, and the online farm management system is further configured to send the image of the livestock or the poultry to a professional when the abnormality type cannot be determined; and when successfully obtaining the abnormality type and the abnormality processing policy that are sent by the online farm management system, performing processing according to the abnormality processing policy; or when failing to obtain the abnormality type and the abnormality processing policy that are sent by the online farm management system, performing processing according to online guidance of the professional or a tutorial video sent by the professional.

11. The method according to claim 10,
wherein the AR display component comprises a lens, a display screen, and a free-form surface; and
the lens is secured at the bottom edge of the helmet body, the free-form surface is embedded in the lens, the display screen is secured at a junction between the lens and the helmet body, and the free-form surface is configured to reflect, to human eyes, the AR image projected by the display screen.

12. The method according to claim 11,
wherein the display screen is a micro-OLED display screen.

13. The method according to claim 11,
wherein a plane on which the lens is located is perpendicular to a plane on which the bottom of the helmet body is located.

14. The method according to claim 10,
further comprising a speaker, wherein the speaker is disposed on the helmet body, and is electrically connected to the controller.

15. The method according to claim 10,
wherein the helmet body comprises a headband and a headband fastener fastened with the headband.

16. The method according to claim 15,
wherein the headband is adjustable.

17. The method according to claim 15,
wherein the headband is provided with operation keys, and the operation keys are electrically connected to the controller.

18. The method according to claim 17,
wherein the operation keys comprise an ON/OFF key, a volume increase key, a volume decrease key, and a scroll wheel.

* * * * *